United States Patent
Bedingfield, Sr. et al.

(10) Patent No.: US 8,019,064 B2
(45) Date of Patent: Sep. 13, 2011

(54) REMOTE NOTIFICATION OF COMMUNICATIONS

(75) Inventors: James C. Bedingfield, Sr., Lilburn, GA (US); David A. Levine, Atlanta, GA (US); Anita Simpson, Decatur, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 803 days.

(21) Appl. No.: 11/960,855

(22) Filed: Dec. 20, 2007

(65) Prior Publication Data

US 2008/0107251 A1    May 8, 2008

Related U.S. Application Data

(63) Continuation of application No. 10/174,026, filed on Jun. 18, 2002, now Pat. No. 7,315,614.

(51) Int. Cl.
*H04M 1/56* (2006.01)
*H04M 15/06* (2006.01)
*H04M 1/64* (2006.01)
*H04M 3/42* (2006.01)

(52) U.S. Cl. ........... 379/142.07; 379/142.01; 379/88.11; 379/88.19; 379/217.01; 455/412.2; 455/415

(58) Field of Classification Search ............. 379/142.01, 379/142.07, 142.12–142.18, 74, 75, 88.11–88.15, 379/88.17, 88.19, 88.21, 188, 212.01, 217.01; 455/412.1, 412.2, 413, 415

See application file for complete search history.

(56) References Cited

U.S. PATENT DOCUMENTS

| | | | |
|---|---|---|---|
| 4,266,098 A | 5/1981 | Novak | |
| 4,268,722 A | 5/1981 | Little et al. | |
| 4,277,649 A | 7/1981 | Sheinbein | |
| 4,582,956 A | 4/1986 | Doughty | |
| 4,649,433 A | 3/1987 | Verhoeven | |
| 4,649,533 A | 3/1987 | Chorley et al. | |
| 4,663,777 A | 5/1987 | Szeto | |
| 4,674,115 A | 6/1987 | Kaleita et al. | |
| 4,698,839 A | 10/1987 | DeVaney et al. | |
| 4,791,664 A | 12/1988 | Lutz et al. | |

(Continued)

FOREIGN PATENT DOCUMENTS

EP    0821511    1/1998

(Continued)

OTHER PUBLICATIONS

AASTRA Telecom, Press Release, Aastra Telecom Introduces CNX Conference Bridge, Aug. 29, 2005, 1 page.

(Continued)

*Primary Examiner* — Quoc D Tran
(74) *Attorney, Agent, or Firm* — Cantor Colburn LLP

(57) ABSTRACT

A remote call notification system for incoming calls to a wireline telecommunications device. The system includes a switch, a service control point, an intelligent server, and a monitoring module all in communication with each other. The remote call notification is transmitted to a remote communication device such as a PC, an interactive pager, and a mobile phone. The call notification includes a calling number, the name of a calling party, time and date identifiers, status identifiers that provides a real-time status of the incoming communication, a disposition identifier, and a priority identifier. A remote call notification method including detecting an incoming communication to a subscriber's wireline communication device, creating a remote call notification, assigning an access address associated with a remote communication device, and forwarding the remote call notification to the remote communication device.

17 Claims, 3 Drawing Sheets

U.S. PATENT DOCUMENTS

| | | |
|---|---|---|
| 4,797,911 A | 1/1989 | Szlam et al. |
| 4,802,202 A | 1/1989 | Takahashi et al. |
| 4,817,133 A | 3/1989 | Takahashi et al. |
| 4,823,304 A | 4/1989 | Frantz et al. |
| 4,845,743 A | 7/1989 | Lutz |
| 4,850,013 A | 7/1989 | Rose |
| 4,850,103 A | 7/1989 | Takemoto et al. |
| 4,995,075 A | 2/1991 | Angiolillo-Bent et al. |
| 5,029,196 A | 7/1991 | Morganstein |
| 5,109,405 A | 4/1992 | Morganstein |
| 5,121,423 A | 6/1992 | Morihiro et al. |
| 5,151,929 A | 9/1992 | Wolf |
| 5,157,712 A | 10/1992 | Wallen, Jr. |
| 5,161,181 A | 11/1992 | Zwick |
| 5,200,994 A | 4/1993 | Sasano et al. |
| 5,206,901 A | 4/1993 | Harlow et al. |
| D338,889 S | 8/1993 | Fuqua et al. |
| 5,260,987 A | 11/1993 | Mauger |
| 5,263,084 A | 11/1993 | Chaput et al. |
| 5,265,145 A | 11/1993 | Lim |
| 5,274,699 A | 12/1993 | Ranz |
| 5,278,894 A | 1/1994 | Shaw |
| 5,289,542 A | 2/1994 | Kessler |
| 5,315,650 A | 5/1994 | Smith et al. |
| 5,329,578 A | 7/1994 | Brennan et al. |
| 5,333,152 A | 7/1994 | Wilber |
| 5,333,186 A | 7/1994 | Gupta |
| 5,338,889 A | 8/1994 | Vora et al. |
| 5,341,411 A | 8/1994 | Hashimoto |
| 5,347,574 A | 9/1994 | Morganstein |
| 5,361,295 A | 11/1994 | Solomon et al. |
| 5,383,466 A | 1/1995 | Partika |
| 5,386,460 A | 1/1995 | Boakes et al. |
| 5,388,150 A | 2/1995 | Schneyer et al. |
| 5,413,605 A | 5/1995 | Ashby et al. |
| 5,420,910 A | 5/1995 | Rudokas et al. |
| 5,420,914 A | 5/1995 | Blumhardt |
| 5,420,920 A | 5/1995 | Capper et al. |
| 5,425,076 A | 6/1995 | Knippelmier |
| 5,425,089 A | 6/1995 | Chan et al. |
| 5,430,719 A | 7/1995 | Weisser, Jr. |
| 5,446,785 A | 8/1995 | Hirai |
| 5,452,089 A | 9/1995 | Bushman |
| 5,452,346 A | 9/1995 | Miyamoto |
| 5,459,779 A | 10/1995 | Backaus et al. |
| 5,466,785 A | 11/1995 | De Framond |
| 5,467,388 A | 11/1995 | Redd, Jr. et al. |
| 5,475,748 A | 12/1995 | Jones et al. |
| 5,481,594 A | 1/1996 | Shen et al. |
| 5,481,599 A | 1/1996 | MacAllister et al. |
| 5,481,602 A | 1/1996 | Griffiths et al. |
| 5,490,205 A | 2/1996 | Kondo et al. |
| 5,497,414 A | 3/1996 | Bartholomew |
| 5,502,762 A | 3/1996 | Andrew et al. |
| 5,506,893 A | 4/1996 | Buscher et al. |
| 5,511,111 A | 4/1996 | Serbetcioglu et al. |
| 5,530,741 A | 6/1996 | Rubin |
| 5,533,106 A | 7/1996 | Blumhardt |
| 5,535,265 A | 7/1996 | Suwandhaputra |
| 5,537,470 A | 7/1996 | Lee |
| 5,539,809 A | 7/1996 | Mayer |
| 5,546,447 A | 8/1996 | Skarbo et al. |
| 5,550,900 A | 8/1996 | Ensor et al. |
| 5,550,905 A | 8/1996 | Silverman |
| 5,563,935 A | 10/1996 | Small |
| 5,563,936 A | 10/1996 | Washington |
| 5,602,908 A | 2/1997 | Fan |
| 5,608,788 A | 3/1997 | Demlow et al. |
| 5,619,561 A | 4/1997 | Reese |
| 5,631,950 A | 5/1997 | Brown |
| 5,636,269 A | 6/1997 | Eisdorfer |
| 5,644,629 A | 7/1997 | Chow |
| 5,646,979 A | 7/1997 | Knuth |
| 5,657,372 A | 8/1997 | Ahlberg et al. |
| D383,466 S | 9/1997 | Burrell et al. |
| 5,668,852 A | 9/1997 | Holmes |
| 5,696,809 A | 12/1997 | Voit |
| 5,696,815 A | 12/1997 | Smyk |
| 5,699,413 A | 12/1997 | Sridhar |
| 5,699,523 A | 12/1997 | Li et al. |
| 5,701,301 A | 12/1997 | Weisser, Jr. |
| 5,703,934 A | 12/1997 | Zicker et al. |
| 5,703,943 A | 12/1997 | Otto |
| H1714 H | 3/1998 | Partridge, III |
| 5,724,412 A | 3/1998 | Srinivasan |
| 5,734,706 A | 3/1998 | Windsor et al. |
| 5,742,668 A | 4/1998 | Pepe et al. |
| 5,742,905 A | 4/1998 | Pepe et al. |
| 5,754,635 A | 5/1998 | Kim |
| 5,754,636 A | 5/1998 | Bayless et al. |
| 5,754,775 A | 5/1998 | Adamson et al. |
| 5,771,281 A | 6/1998 | Batten, Jr. |
| 5,771,283 A | 6/1998 | Chang et al. |
| 5,781,621 A | 7/1998 | Lim et al. |
| 5,784,444 A | 7/1998 | Snyder et al. |
| 5,796,806 A | 8/1998 | Birckbichler |
| 5,799,072 A | 8/1998 | Vulcan et al. |
| 5,802,160 A | 9/1998 | Kugell et al. |
| 5,802,251 A | 9/1998 | Cohen et al. |
| 5,805,587 A | 9/1998 | Norris et al. |
| 5,805,682 A | 9/1998 | Voit et al. |
| 5,805,997 A | 9/1998 | Farris |
| 5,809,128 A | 9/1998 | McMullin |
| 5,812,533 A | 9/1998 | Cox et al. |
| 5,812,649 A | 9/1998 | Shen |
| 5,838,774 A | 11/1998 | Weisser, Jr. |
| 5,841,838 A | 11/1998 | Itoh et al. |
| 5,841,850 A | 11/1998 | Fan |
| 5,848,142 A | 12/1998 | Yaker |
| 5,850,435 A | 12/1998 | Devillier |
| 5,850,436 A | 12/1998 | Rosen et al. |
| 5,857,017 A | 1/1999 | Ohi |
| 5,859,903 A | 1/1999 | Lee |
| 5,872,834 A | 2/1999 | Teitelbaum |
| 5,872,934 A | 2/1999 | Whitehouse et al. |
| 5,875,239 A | 2/1999 | Koralewski et al. |
| 5,875,241 A | 2/1999 | Chang et al. |
| 5,878,036 A | 3/1999 | Spartz et al. |
| 5,883,942 A | 3/1999 | Lim et al. |
| 5,884,144 A | 3/1999 | Chavez, Jr. et al. |
| 5,894,504 A | 4/1999 | Alfred et al. |
| 5,901,209 A | 5/1999 | Tannenbaum et al. |
| 5,901,212 A | 5/1999 | True et al. |
| 5,903,636 A | 5/1999 | Malik |
| 5,905,794 A | 5/1999 | Gunn et al. |
| 5,907,596 A | 5/1999 | Karnowski |
| 5,907,604 A | 5/1999 | Hsu |
| 5,915,000 A | 6/1999 | Nguyen et al. |
| 5,917,817 A | 6/1999 | Dunn et al. |
| 5,918,213 A | 6/1999 | Bernard et al. |
| 5,923,744 A | 7/1999 | Cheng et al. |
| 5,930,701 A | 7/1999 | Skog |
| 5,940,484 A | 8/1999 | DeFazio et al. |
| 5,943,416 A | 8/1999 | Gisby |
| 5,946,363 A | 8/1999 | Rominger et al. |
| 5,946,636 A | 8/1999 | Uyeno et al. |
| 5,946,684 A | 8/1999 | Lund |
| D413,605 S | 9/1999 | Thomas et al. |
| 5,948,040 A | 9/1999 | DeLorme et al. |
| 5,948,061 A | 9/1999 | Merriman et al. |
| 5,949,865 A | 9/1999 | Fusinato |
| 5,953,399 A | 9/1999 | Farris et al. |
| 5,953,657 A | 9/1999 | Ghisler |
| 5,963,626 A | 10/1999 | Nabkel |
| 5,969,647 A | 10/1999 | Mou et al. |
| 5,970,127 A | 10/1999 | Smith et al. |
| 5,970,128 A | 10/1999 | Kim |
| 5,974,309 A | 10/1999 | Foti |
| 5,982,866 A | 11/1999 | Kowalski |
| 5,991,377 A | 11/1999 | Malik |
| 5,999,207 A | 12/1999 | Rodriquez et al. |
| 5,999,599 A | 12/1999 | Shaffer et al. |
| 5,999,613 A | 12/1999 | Nabkel et al. |
| 6,005,870 A | 12/1999 | Leung et al. |
| 6,006,087 A | 12/1999 | Amin |
| 6,009,321 A | 12/1999 | Wang et al. |
| 6,014,559 A | 1/2000 | Amin |

| | | | |
|---|---|---|---|
| 6,016,512 A | 1/2000 | Huitema |
| 6,021,188 A | 2/2000 | Meg |
| 6,021,427 A | 2/2000 | Spagna et al. |
| 6,031,899 A | 2/2000 | Wu |
| 6,044,148 A | 3/2000 | Bleile |
| 6,049,291 A | 4/2000 | Kikinis |
| 6,058,171 A | 5/2000 | Hoopes |
| 6,061,434 A | 5/2000 | Corbett |
| 6,061,566 A | 5/2000 | Friman |
| 6,064,876 A | 5/2000 | Ishida et al. |
| 6,065,844 A | 5/2000 | Chen |
| 6,072,859 A | 6/2000 | Kong |
| 6,078,581 A | 6/2000 | Shtivelman et al. |
| 6,091,947 A | 7/2000 | Sumner et al. |
| 6,094,478 A | 7/2000 | Shepherd et al. |
| 6,094,573 A | 7/2000 | Heinonen et al. |
| 6,094,574 A | 7/2000 | Vance et al. |
| 6,094,575 A | 7/2000 | Anderson et al. |
| 6,101,246 A | 8/2000 | Heinmiller et al. |
| 6,104,784 A | 8/2000 | Robbins et al. |
| 6,104,800 A | 8/2000 | Benson |
| 6,108,630 A | 8/2000 | Kuechlet et al. |
| 6,111,939 A | 8/2000 | Brabanec |
| 6,134,235 A | 10/2000 | Goldman et al. |
| 6,134,311 A | 10/2000 | Ekstrom |
| 6,137,870 A | 10/2000 | Scherer |
| 6,137,871 A | 10/2000 | Maier et al. |
| 6,141,341 A | 10/2000 | Jones et al. |
| 6,141,409 A | 10/2000 | Madoch et al. |
| 6,144,644 A | 11/2000 | Bajzath et al. |
| 6,154,531 A | 11/2000 | Clapper |
| 6,160,876 A | 12/2000 | Moss et al. |
| 6,161,021 A | 12/2000 | Akpa |
| 6,163,595 A | 12/2000 | Parker et al. |
| 6,163,607 A | 12/2000 | Bogart et al. |
| 6,163,691 A | 12/2000 | Buettner et al. |
| 6,167,254 A | 12/2000 | Chavez, Jr. et al. |
| 6,169,911 B1 | 1/2001 | Wagner et al. |
| 6,173,049 B1 | 1/2001 | Malik |
| 6,178,232 B1 | 1/2001 | Latter et al. |
| 6,181,928 B1 | 1/2001 | Moon |
| D437,879 S | 2/2001 | Weinandt |
| 6,185,289 B1 | 2/2001 | Hetz et al. |
| 6,185,426 B1 | 2/2001 | Alperovich |
| 6,192,115 B1 | 2/2001 | Toy et al. |
| 6,192,116 B1 | 2/2001 | Mayak |
| 6,198,480 B1 | 3/2001 | Cotugno et al. |
| 6,198,920 B1 | 3/2001 | Doviak et al. |
| 6,202,023 B1 | 3/2001 | Hancock et al. |
| 6,219,407 B1 | 4/2001 | Kanevsky et al. |
| 6,219,413 B1 | 4/2001 | Burg |
| 6,222,826 B1 | 4/2001 | Faynberg et al. |
| 6,226,367 B1 | 5/2001 | Smith et al. |
| 6,226,369 B1 | 5/2001 | Lim et al. |
| 6,226,399 B1 | 5/2001 | Robinson |
| 6,229,883 B1 | 5/2001 | Kakizaki et al. |
| 6,230,006 B1 | 5/2001 | Keenan et al. |
| 6,233,325 B1 | 5/2001 | Frech et al. |
| 6,236,975 B1 | 5/2001 | Boe et al. |
| 6,243,448 B1 | 6/2001 | Corbett et al. |
| 6,243,461 B1 | 6/2001 | Hwang et al. |
| 6,246,976 B1 | 6/2001 | Mukaigawa et al. |
| 6,252,952 B1 | 6/2001 | Kung et al. |
| 6,256,671 B1 | 7/2001 | Strentzsch et al. |
| 6,262,987 B1 | 7/2001 | Mogul |
| 6,266,399 B1 | 7/2001 | Weller et al. |
| 6,278,704 B1 | 8/2001 | Creamer et al. |
| 6,278,862 B1 | 8/2001 | Henderson |
| 6,282,275 B1 | 8/2001 | Gurbani et al. |
| 6,292,479 B1 | 9/2001 | Bartholomew et al. |
| 6,292,549 B1 | 9/2001 | Lung et al. |
| 6,295,502 B1 | 9/2001 | Hancock et al. |
| 6,301,342 B1 | 10/2001 | Ander et al. |
| 6,301,350 B1 | 10/2001 | Henningson et al. |
| 6,304,644 B2 | 10/2001 | Karnowski |
| 6,310,943 B1 | 10/2001 | Kowakski |
| 6,311,057 B1 | 10/2001 | Barvesten |
| 6,317,488 B1 | 11/2001 | DePond et al. |
| 6,317,781 B1 | 11/2001 | De Boor et al. |
| 6,324,263 B1 | 11/2001 | Sherwood et al. |
| 6,324,271 B1 | 11/2001 | Sawyer et al. |
| 6,327,347 B1 | 12/2001 | Gutzmann |
| 6,332,021 B2 | 12/2001 | Latter et al. |
| 6,333,973 B1 | 12/2001 | Smith et al. |
| 6,337,904 B1 | 1/2002 | Gisby |
| 6,337,979 B1 | 1/2002 | Nakayasu |
| 6,339,639 B1 | 1/2002 | Henderon |
| 6,341,161 B1 | 1/2002 | Latter et al. |
| 6,345,187 B1 | 2/2002 | Berthoud et al. |
| 6,347,136 B1 | 2/2002 | Horan |
| 6,351,637 B1 | 2/2002 | Lee |
| 6,353,664 B1 | 3/2002 | Cannon et al. |
| 6,361,637 B2 | 3/2002 | Martin et al. |
| 6,363,140 B1 | 3/2002 | Pinard |
| 6,363,411 B1 | 3/2002 | Dugan et al. |
| 6,363,664 B1 | 4/2002 | Brutsaert |
| 6,366,661 B1 | 4/2002 | Devillier et al. |
| 6,366,772 B1 | 4/2002 | Arnson |
| 6,377,807 B1 | 4/2002 | Iparrea et al. |
| 6,377,979 B1 | 4/2002 | Yamashita et al. |
| 6,389,124 B1 | 5/2002 | Schnarel et al. |
| 6,389,132 B1 | 5/2002 | Price |
| 6,400,809 B1 | 6/2002 | Bossemeyer, Jr. et al. |
| 6,400,947 B1 | 6/2002 | Bright et al. |
| 6,404,868 B1 | 6/2002 | Beamish et al. |
| 6,404,875 B2 | 6/2002 | Malik et al. |
| 6,411,692 B1 | 6/2002 | Scherer |
| 6,421,425 B1 | 7/2002 | Bossi et al. |
| 6,422,263 B1 | 7/2002 | Spicer |
| 6,427,003 B1 | 7/2002 | Corbett et al. |
| 6,427,064 B1 | 7/2002 | Henderson |
| 6,434,394 B1 | 8/2002 | Grundvig et al. |
| 6,437,879 B1 | 8/2002 | Temple |
| 6,438,216 B1 | 8/2002 | Aktas |
| 6,438,217 B1 | 8/2002 | Huna |
| 6,438,584 B1 | 8/2002 | Powers |
| 6,438,898 B1 | 8/2002 | Lew et al. |
| 6,442,249 B1 | 8/2002 | Miller, Jr. |
| 6,442,262 B1 | 8/2002 | Moss et al. |
| 6,442,263 B1 | 8/2002 | Beaton et al. |
| 6,442,283 B1 | 8/2002 | Tewfik et al. |
| 6,445,781 B1 | 9/2002 | Heinmiller et al. |
| 6,449,351 B1 | 9/2002 | Moss et al. |
| 6,449,361 B1 | 9/2002 | Okuda |
| 6,462,646 B2 | 10/2002 | Helferich |
| 6,466,653 B1 | 10/2002 | Hamrick et al. |
| 6,477,246 B1 | 11/2002 | Dolan et al. |
| 6,480,589 B1 | 11/2002 | Lee et al. |
| 6,493,430 B2 | 12/2002 | Leuca et al. |
| 6,493,431 B1 | 12/2002 | Troen-Krasnow et al. |
| 6,493,437 B1 | 12/2002 | Olshansky |
| 6,493,439 B1 | 12/2002 | Lung et al. |
| 6,494,953 B2 | 12/2002 | Hayes et al. |
| 6,496,569 B2 | 12/2002 | Pelletier et al. |
| 6,496,571 B1 | 12/2002 | Wilson |
| 6,496,692 B1 | 12/2002 | Shanahan |
| 6,498,841 B2 | 12/2002 | Bull et al. |
| 6,507,737 B1 | 1/2003 | Laham et al. |
| 6,529,500 B1 | 3/2003 | Pandharipande |
| 6,529,591 B1 | 3/2003 | Dosani et al. |
| 6,532,490 B1 | 3/2003 | Lewis et al. |
| 6,539,080 B1 | 3/2003 | Bruce et al. |
| 6,542,583 B1 | 4/2003 | Taylor |
| 6,542,586 B1 | 4/2003 | Helstab |
| 6,542,591 B1 | 4/2003 | Amro et al. |
| 6,542,602 B1 | 4/2003 | Elazar |
| 6,542,812 B1 | 4/2003 | Obradovich et al. |
| 6,546,092 B2 | 4/2003 | Corbett et al. |
| 6,549,621 B1 | 4/2003 | Christie, IV et al. |
| 6,553,110 B1 | 4/2003 | Peng |
| 6,553,221 B1 | 4/2003 | Nakamura et al. |
| 6,556,540 B1 | 4/2003 | Mawhinney et al. |
| 6,560,317 B1 | 5/2003 | Quagliana |
| 6,560,327 B1 | 5/2003 | McConnell |
| 6,566,995 B2 | 5/2003 | Furuuchi et al. |
| 6,570,971 B2 | 5/2003 | Latter et al. |
| 6,570,974 B1 | 5/2003 | Gerszberg et al. |
| 6,574,319 B2 | 6/2003 | Latter et al. |

| | | |
|---|---|---|
| 6,580,904 B2 | 6/2003 | Cox et al. |
| 6,584,490 B1 | 6/2003 | Schuster et al. |
| 6,587,458 B1 | 7/2003 | Burg et al. |
| 6,590,970 B1 | 7/2003 | Cai et al. |
| 6,597,905 B1 | 7/2003 | Hijii |
| 6,603,840 B2 | 8/2003 | Fellingham et al. |
| 6,603,854 B1 | 8/2003 | Judkins et al. |
| 6,608,891 B1 | 8/2003 | Pelletier et al. |
| 6,618,474 B1 | 9/2003 | Reese |
| 6,625,595 B1 | 9/2003 | Anderson et al. |
| 6,631,181 B1 | 10/2003 | Bates et al. |
| 6,633,633 B1 | 10/2003 | Bedingfield |
| 6,639,979 B1 | 10/2003 | Kim |
| 6,650,743 B2 | 11/2003 | Heinmiller et al. |
| 6,659,597 B2 | 12/2003 | Murata et al. |
| 6,661,785 B1 | 12/2003 | Zhang et al. |
| 6,665,378 B1 | 12/2003 | Spielman et al. |
| 6,665,388 B2 | 12/2003 | Bedingfield |
| 6,665,715 B1 | 12/2003 | Houri |
| 6,675,008 B1 | 1/2004 | Paik et al. |
| 6,677,894 B2 | 1/2004 | Sheynblat et al. |
| 6,683,870 B1 | 1/2004 | Archer |
| 6,687,341 B1 | 2/2004 | Koch et al. |
| 6,697,357 B2 | 2/2004 | Emerson, III |
| 6,701,160 B1 | 3/2004 | Pinder et al. |
| 6,714,519 B2 | 3/2004 | Luzzatti et al. |
| 6,718,021 B2 | 4/2004 | Crockett et al. |
| 6,721,407 B1 | 4/2004 | Michelena |
| 6,724,872 B1 | 4/2004 | Moore et al. |
| 6,725,872 B1 | 4/2004 | Kindell et al. |
| 6,728,355 B2 | 4/2004 | Kowalski |
| 6,728,360 B1 | 4/2004 | Brennan |
| 6,728,365 B1 | 4/2004 | Li et al. |
| 6,731,727 B2 | 5/2004 | Corbett et al. |
| 6,732,188 B1 | 5/2004 | Flockhart et al. |
| 6,738,615 B1 | 5/2004 | Chow et al. |
| 6,751,457 B1 | 6/2004 | Martin |
| 6,757,274 B1 | 6/2004 | Bedingfield et al. |
| 6,757,530 B2 | 6/2004 | Rouse et al. |
| 6,757,732 B1 | 6/2004 | Sollee et al. |
| 6,757,740 B1 | 6/2004 | Parekh et al. |
| 6,760,413 B2 | 7/2004 | Cannon et al. |
| 6,765,998 B2 | 7/2004 | Bruce et al. |
| D494,953 S | 8/2004 | Leung |
| 6,771,755 B1 | 8/2004 | Simpson |
| 6,771,956 B1 | 8/2004 | Beeler |
| 6,775,366 B1 | 8/2004 | Cobbett et al. |
| 6,775,371 B2 | 8/2004 | Elsey et al. |
| 6,775,540 B2 | 8/2004 | Iyer |
| 6,778,524 B1 | 8/2004 | Augart |
| 6,779,020 B1 | 8/2004 | Henrick |
| 6,785,301 B1 | 8/2004 | Chapman et al. |
| 6,785,368 B1 | 8/2004 | Eason et al. |
| 6,785,540 B1 | 8/2004 | Wichelman |
| 6,792,266 B1 | 9/2004 | Masuda et al. |
| 6,798,841 B2 | 9/2004 | Hansen |
| 6,798,876 B1 | 9/2004 | Bala |
| 6,798,879 B1 | 9/2004 | Beham |
| 6,804,503 B2 | 10/2004 | Shohara et al. |
| 6,807,267 B2 | 10/2004 | Moss et al. |
| 6,810,077 B1 | 10/2004 | Dezonno |
| 6,810,115 B2 | 10/2004 | Fukuda |
| 6,813,344 B1 | 11/2004 | Lemke |
| 6,816,481 B1 | 11/2004 | Adams et al. |
| 6,818,474 B2 | 11/2004 | Kim et al. |
| 6,826,270 B1 | 11/2004 | Welch et al. |
| 6,826,271 B1 | 11/2004 | Kanabar et al. |
| 6,826,617 B1 | 11/2004 | Ansell et al. |
| 6,829,348 B1 | 12/2004 | Schroeder et al. |
| 6,830,595 B2 | 12/2004 | Reynolds, III |
| 6,831,974 B1 | 12/2004 | Watson et al. |
| 6,842,512 B2 | 1/2005 | Pedersen |
| 6,845,151 B2 | 1/2005 | Peng |
| 6,845,512 B2 | 1/2005 | Horng et al. |
| 6,853,710 B2 | 2/2005 | Harris |
| 6,853,711 B2 | 2/2005 | Brisebois et al. |
| 6,856,677 B2 | 2/2005 | Leijonhufvud |
| 6,859,527 B1 | 2/2005 | Banks et al. |
| 6,865,266 B1 | 3/2005 | Pershan |
| 6,865,384 B2 | 3/2005 | Sagi et al. |
| 6,868,155 B1 | 3/2005 | Cannon et al. |
| 6,870,924 B1 | 3/2005 | Ukon |
| 6,871,076 B2 | 3/2005 | Samn |
| 6,888,927 B1 | 5/2005 | Cruickshank et al. |
| 6,888,972 B2 | 5/2005 | Berg et al. |
| 6,891,940 B1 | 5/2005 | Bhandari et al. |
| 6,898,275 B2 | 5/2005 | Dolan et al. |
| 6,904,137 B2 | 6/2005 | Brandt et al. |
| 6,904,276 B1 | 6/2005 | Freeman et al. |
| 6,907,034 B1 | 6/2005 | Begis |
| 6,909,777 B2 | 6/2005 | Latter et al. |
| 6,914,953 B2 | 7/2005 | Boerstler |
| 6,917,960 B1 | 7/2005 | Decasper et al. |
| 6,922,411 B1 | 7/2005 | Taylor |
| 6,928,154 B1 | 8/2005 | Cheaito et al. |
| 6,931,007 B2 | 8/2005 | Jones |
| 6,947,531 B1 | 9/2005 | Lewis et al. |
| 6,952,469 B2 | 10/2005 | Han |
| 6,970,546 B2 | 11/2005 | Kent, Jr. et al. |
| 6,977,993 B2 | 12/2005 | Starbuck et al. |
| 6,996,211 B2 | 2/2006 | Reynolds et al. |
| 7,012,999 B2 | 3/2006 | Ruckart |
| 7,016,482 B2 | 3/2006 | Moss et al. |
| 7,020,250 B2 | 3/2006 | Lew et al. |
| 7,027,408 B2 | 4/2006 | Nabkel et al. |
| 7,027,569 B2 | 4/2006 | Price |
| 7,076,051 B2 | 7/2006 | Brown et al. |
| 7,079,837 B1 | 7/2006 | Sherman et al. |
| 7,085,257 B1 | 8/2006 | Karves et al. |
| 7,085,358 B2 | 8/2006 | Ruckart et al. |
| 7,085,578 B2 | 8/2006 | Barclay et al. |
| 7,095,715 B2 | 8/2006 | Buckman et al. |
| 7,097,169 B2 | 8/2006 | Mueller |
| 7,103,167 B2 | 9/2006 | Brahm et al. |
| 7,103,662 B2 | 9/2006 | Ray et al. |
| 7,107,077 B2 | 9/2006 | Lee |
| 7,113,577 B2 | 9/2006 | Cook et al. |
| 7,127,488 B1 | 10/2006 | Scott et al. |
| 7,139,374 B1 | 11/2006 | Scott et al. |
| 7,152,118 B2 | 12/2006 | Anderson, IV et al. |
| 7,155,211 B2 | 12/2006 | Mun et al. |
| 7,184,533 B1 | 2/2007 | Shaffer et al. |
| 7,200,673 B1 | 4/2007 | Augart |
| 7,215,750 B2 | 5/2007 | Nguyen et al. |
| 7,228,129 B1 | 6/2007 | Ward et al. |
| 7,254,226 B1 | 8/2007 | Roberts et al. |
| 7,257,210 B1 | 8/2007 | Henderson |
| 7,313,227 B2 | 12/2007 | Jones |
| 7,315,614 B2 * | 1/2008 | Bedingfield, Sr. et al. .................. 379/142.07 |
| 7,386,319 B2 | 6/2008 | Rogalski et al. |
| 7,403,768 B2 * | 7/2008 | Bedingfield, Sr. et al. 455/414.1 |
| 7,418,096 B2 | 8/2008 | Moton et al. |
| 7,443,964 B2 | 10/2008 | Urban et al. |
| 7,613,810 B2 | 11/2009 | Romero et al. |
| 7,623,645 B1 | 11/2009 | Scott et al. |
| 7,631,047 B1 | 12/2009 | Adamczyk et al. |
| 7,653,191 B1 | 1/2010 | Glasser et al. |
| 7,672,444 B2 | 3/2010 | Perrella et al. |
| 2001/0002209 A1 | 5/2001 | Han |
| 2001/0005854 A1 | 6/2001 | Murata et al. |
| 2001/0006519 A1 | 7/2001 | Voit |
| 2001/0036174 A1 | 11/2001 | Herring |
| 2001/0044898 A1 | 11/2001 | Benussi et al. |
| 2001/0048737 A1 | 12/2001 | Goldberg et al. |
| 2002/0007400 A1 | 1/2002 | Pedersen |
| 2002/0009184 A1 | 1/2002 | Shnier |
| 2002/0012426 A1 | 1/2002 | Gupton |
| 2002/0016748 A1 | 2/2002 | Emodi et al. |
| 2002/0023265 A1 | 2/2002 | Metcalf |
| 2002/0041605 A1 | 4/2002 | Benussi et al. |
| 2002/0055926 A1 | 5/2002 | Dan et al. |
| 2002/0067816 A1 | 6/2002 | Bushnell |
| 2002/0077102 A1 | 6/2002 | Achuthan et al. |
| 2002/0082050 A1 | 6/2002 | Mountney et al. |
| 2002/0085687 A1 | 7/2002 | Contractor et al. |
| 2002/0091777 A1 | 7/2002 | Schwartz |
| 2002/0118812 A1 | 8/2002 | Contractor |

| | | |
|---|---|---|
| 2002/0119430 A1 | 8/2002 | Szynalski |
| 2002/0120629 A1 | 8/2002 | Leonard |
| 2002/0122401 A1 | 9/2002 | Xiang et al. |
| 2002/0125929 A1 | 9/2002 | Chen et al. |
| 2002/0128033 A1 | 9/2002 | Burgess |
| 2002/0136381 A1 | 9/2002 | Shaffer et al. |
| 2002/0171581 A1 | 11/2002 | Sheynblat et al. |
| 2002/0172338 A1 | 11/2002 | Lee et al. |
| 2002/0176563 A1 | 11/2002 | Kryvossidis et al. |
| 2002/0183098 A1 | 12/2002 | Lee et al. |
| 2002/0188443 A1 | 12/2002 | Reddy et al. |
| 2002/0197991 A1 | 12/2002 | Anvekar et al. |
| 2003/0002633 A1 | 1/2003 | Kredo et al. |
| 2003/0006912 A1 | 1/2003 | Brescia |
| 2003/0012353 A1 | 1/2003 | Tang et al. |
| 2003/0016143 A1 | 1/2003 | Ghazarian |
| 2003/0016800 A1 | 1/2003 | Fukuda |
| 2003/0021290 A1 | 1/2003 | Jones |
| 2003/0026416 A1 | 2/2003 | Fusco |
| 2003/0032414 A1 | 2/2003 | Melaku et al. |
| 2003/0043974 A1 | 3/2003 | Emerson, III |
| 2003/0050100 A1 | 3/2003 | Dent |
| 2003/0053602 A1 | 3/2003 | Stuckman et al. |
| 2003/0063730 A1 | 4/2003 | Woodring |
| 2003/0063731 A1 | 4/2003 | Woodring |
| 2003/0065776 A1 | 4/2003 | Malik et al. |
| 2003/0068020 A1 | 4/2003 | Hamrick et al. |
| 2003/0092384 A1 | 5/2003 | Ross, III |
| 2003/0092432 A1 | 5/2003 | Hwang |
| 2003/0095650 A1 | 5/2003 | Mize |
| 2003/0096581 A1 | 5/2003 | Takamine |
| 2003/0103608 A1 | 6/2003 | Pearson et al. |
| 2003/0112938 A1 | 6/2003 | Kanakubo et al. |
| 2003/0119522 A1 | 6/2003 | Barclay et al. |
| 2003/0133543 A1 | 7/2003 | Khakoo et al. |
| 2003/0133553 A1 | 7/2003 | Kahkoo et al. |
| 2003/0133653 A1 | 7/2003 | Barros et al. |
| 2003/0135562 A1 | 7/2003 | Himmel et al. |
| 2003/0148758 A1 | 8/2003 | McMullin |
| 2003/0152207 A1 | 8/2003 | Ryan |
| 2003/0187949 A1 | 10/2003 | Bhatt et al. |
| 2003/0193967 A1 | 10/2003 | Fenton et al. |
| 2003/0196206 A1 | 10/2003 | Shusman |
| 2003/0198322 A1 | 10/2003 | White, Jr. |
| 2003/0215070 A1 | 11/2003 | Akhteruzzaman et al. |
| 2003/0219107 A1 | 11/2003 | Richardson et al. |
| 2004/0049545 A1 | 3/2004 | Lockridge et al. |
| 2004/0101118 A1 | 5/2004 | Powell |
| 2004/0101124 A1 | 5/2004 | Koch et al. |
| 2004/0109558 A1 | 6/2004 | Koch |
| 2004/0114603 A1 | 6/2004 | Suhail et al. |
| 2004/0114730 A1 | 6/2004 | Koch et al. |
| 2004/0120475 A1 | 6/2004 | Bauer et al. |
| 2004/0125929 A1 | 7/2004 | Pope |
| 2004/0171370 A1 | 9/2004 | Natarajan |
| 2004/0181587 A1 | 9/2004 | Cao et al. |
| 2004/0202298 A1 | 10/2004 | Lopez et al. |
| 2004/0202299 A1 | 10/2004 | Schwartz |
| 2004/0208301 A1 | 10/2004 | Urban et al. |
| 2004/0208302 A1 | 10/2004 | Urban et al. |
| 2004/0209604 A1 | 10/2004 | Urban et al. |
| 2004/0209605 A1 | 10/2004 | Urban et al. |
| 2004/0209640 A1 | 10/2004 | Urban et al. |
| 2004/0213207 A1 | 10/2004 | Silver et al. |
| 2004/0213396 A1 | 10/2004 | MacNamara et al. |
| 2004/0218743 A1 | 11/2004 | Hussain et al. |
| 2004/0233892 A1 | 11/2004 | Roberts et al. |
| 2004/0242212 A1 | 12/2004 | Bacon et al. |
| 2004/0248560 A1 | 12/2004 | Bedingfield, Sr. |
| 2005/0068166 A1 | 3/2005 | Baker |
| 2005/0073999 A1 | 4/2005 | Koch |
| 2005/0100158 A1 | 5/2005 | Kreiner et al. |
| 2005/0107074 A1 | 5/2005 | Zellner |
| 2005/0147228 A1 | 7/2005 | Perrella et al. |
| 2005/0157861 A1 | 7/2005 | Bossemeyer et al. |
| 2006/0002540 A1 | 1/2006 | Kreiner et al. |
| 2006/0013375 A1 | 1/2006 | Smith et al. |
| 2006/0029209 A1 | 2/2006 | Moton et al. |
| 2006/0062374 A1 | 3/2006 | Gupta |
| 2006/0152207 A1 | 7/2006 | Riebel et al. |
| 2006/0153173 A1 | 7/2006 | Beck et al. |
| 2006/0270392 A1 | 11/2006 | Scott et al. |
| 2007/0064911 A1 | 3/2007 | Bedingfield, Sr. et al. |
| 2007/0121825 A1 | 5/2007 | Walsh et al. |

FOREIGN PATENT DOCUMENTS

| | | |
|---|---|---|
| KR | 2002014945 | 2/2002 |
| WO | 97/50225 | 12/1997 |
| WO | 03/030501 A1 | 4/2003 |
| WO | 03/030502 A1 | 4/2003 |
| WO | 03/090432 A1 | 10/2003 |

OTHER PUBLICATIONS

Address Allocation for Private Internets, Rekhter et al., pp. 1-8, Feb. 1996.
Bellcore Specification TR-NWT-000310, Calling Number Delivery, Issue 4, Dec. 1992.
Bellcore Specification TR-NWT-001188, Calling Name Delivery Generic Requirements, Issue 1, Dec. 1991.
T. Farley et al.; "Cellular Telephone Basics: AMPS & Beyond;" [online]; [retrieved on Mar. 6, 2003]; retrieved from the Internet http://www.privateline.com/Cellbasics/Cellbasics.html.
J. Boswell, G. Lingenauber, An Advanced HF Receiver Design, Jul. 1994, IEE, Conference Publication. No. 392, pp. 41-47.
Mark H. Norris, Transmitter Architectures, 1998, IEE, pp. 4/1-4/6.
OKI Silicon Solutions Company, Japan Site, "Multi-Lingual Text-to-Speech Processor ML2110;" [online]; [retrieved on Aug. 31, 2005] retrieved from the Internet http://www.//oki.com/semi/English/m12110/htm.
RBS 884 Pico System Description, Author Unknown, Ericsson 1/1551-AE/LZB 119 2269 Uae Rev A, Apr. 23, 1998.
SIP: Session Initiation Protocol, Handley et al., Mar. 1999.
Slawson, "Caller ID Basics;" [online]; [retrieved on Oct. 31, 2001]; retrieved from the Internet http://www.testmark.com/develop/tml_callerid_cnt.html.
SmartHome "The Caller ID System that Speaks for Itself!;" [online]; [retrieved on Aug. 31, 2005]; retrieved from the Internet http://www.smarthome.com/5154.html.
SmartHome "The Caller ID System that SPEAKS of Itself! Talking Caller ID;" [online]; [retrieved on Nov. 5, 2001]; retrieved from the Internet http://www.smarthome.com/5154.html.
"Talking Caller ID by Stealth Software;" [online]; [retrieved on Nov. 5, 2001]; retrieved from the Internet http://www.talkingcallerid.com/.
The IP Network Address Translator (NAT), Egevang et al., May 1994.
"Time Division Multiple Access (TDMA);" [online]; [retrieved on Mar. 6, 2003]; retrieved from the Internet http://www.iec.org/online/tutorials/tdma/.
"Venture IP Telephone System" AASTRA [online]; [retrieved on Aug. 31, 2001]; retrieved from the Internet http://www.aastra.com/products/callerids/voicecallerid/be-6060.html.
"Venture IP Telephone System" AASTRA; [online]; [retrieved on Nov. 5, 2001]; retrieved from the Internet http://www.aastra.com/products/callerids/voicecallerid/be-6090.html.
Voice-9090 "Talking Caller ID", Aastra Telecom-Talking Caller ID-Voice 9090, [online]; [retrieved on Nov. 5, 2001]; http://www.aastra.com/products/callerids/voicecallerid/be-9090.html.
International Search Report PCT/US02/30068, Dec. 9, 2002.
International Search Report PCT/US02/29988, Sep. 23, 2002.
U.S. Appl. No. 10/032,724, filed Dec. 27, 2001, Harold et al.
U.S. Appl. No. 10/200,906, filed Jul. 23, 2002, Scott et al.
U.S. Appl. No. 10/144,555, filed May 13, 2002, Koch et al.
U.S. Appl. No. 10/144,556, filed May 13, 2002, Koch et al.
U.S. Appl. No. 10/152,544, filed May 21, 2002, Alston et al.
U.S. Appl. No. 10/200,874, filed Jul. 23, 2002, Scott et al.
U.S. Appl. No. 09/812,338, filed Mar. 19, 2001, Smith.

* cited by examiner

REMOTE NOTIFICATION OF COMMUNICATIONS

CROSS REFERENCE TO RELATED APPLICATIONS

This application is a continuation of U.S. patent application Ser. No. 10/174,026 filed Jun. 18, 2002, the entire contents of which is incorporated herein by reference, which claims priority to U.S. Provisional Application Ser. No. 60/312,281, filed Aug. 14, 2001, entitled "METHOD FOR USING AIN TO DELIVER WIRELINE CALLER ID TO TEXT/ALPHA NUMERIC PAGERS AS WELL AS OTHER WIRELESS DEVICES UTILIZING LANDLINES." This application filed Dec. 20, 2000, entitled "SYSTEM AND METHOD FOR MONITORING INCOMING COMMUNICATIONS TO A TELECOMMUNICATIONS DEVICE," which is incorporated herein by reference. This application filed the same day as the present application by Bedingfield, entitled "METHOD FOR USING AIN TO DELIVER CALLER ID TO TEXT/ALPHA-NUMERIC PAGERS AS WELL AS OTHER WIRELESS DEVICES, FOR CALLS DELIVERED TO WIRELESS NETWORKS" the disclosure of which is also incorporated herein by reference.

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but otherwise reserves all copyrights whatsoever.

BACKGROUND OF THE INVENTION

1. Field of the Invention

This invention relates generally to the field of communications. More particularly, this invention manages detailed information about all incoming communications to a landline communications device, such as a residential phone connected to the Public Switch Telephone Network (PSTN), and delivers this information to a wireless communications device, such as an alphanumeric pager.

2. Description of the Related Art

The field of telecommunications has experienced explosive growth, and more growth is planned as telecommunication access and numerous communication devices improve. This explosive growth is revolutionizing message notification and similar services. For example, U.S. Pat. No. 6,006,087 discloses a method and system for delivering a voice mail notification of a voice message left on a subscriber's wireless service network. When a message is left in a subscriber's mailbox assigned to the subscriber's cellular phone, the voice mail system generates a voice mail notification that includes a calling number, the name of the calling party, and an index listing various messages so that a subscriber can scroll through the messages and choose a desired message to retrieve and play. The voice mail notification is forwarded to and displayed by the cellular phone operated by a subscriber.

In today's telecommunications world, it is commonplace for subscribers to have multiple wired (i.e., landline) and wireless communications devices connected to various global telecommunications networks. For example, a subscriber may have a first phone number assigned to a residential landline telephone, a second phone number assigned to a business telephone, a third phone number assigned to a mobile phone, and a fourth phone number assigned to a wireless paging device. Thus, many subscribers have multiple wired and wireless devices with each device having a different phone number and with each device connected to different messaging systems and to different communications networks.

When an incoming communication is placed to a particular communications device, a subscriber typically has no way of knowing about that incoming communication if the subscriber is away from the communications device. Using a conventional approach, when a message is left on a messaging system assigned to a particular communication device, the messaging system causes the associated communications network to set the message waiting indicator on the called communications device; however, it is incapable of setting detailed messaging information on the subscriber's other additional communications devices (wired and wireless). For example, when a message is left on a subscriber's mobile phone messaging network, the subscriber's paging device is incapable of providing detailed messaging information associated with the message left on the mobile phone messaging network. Since the purpose of having multiple communication devices is to allow a subscriber to maintain constant communication, conventional approaches fall short by not being able to provide the ability to deliver detailed messaging information across all communication devices. Within the prior art, subscribers have attempted to overcome this deficiency by utilizing a feature in voice mail systems referred to as outbound calling. An outbound calling feature allows a subscriber to designate a telephone number (that may be assigned to a different communications device) that is dialed by the voice mail system during a fixed time period if a message is waiting for the subscriber in the voice mail system.

Using this approach, subscribers have also designated pagers' phone numbers as the number to be called for the outbound calling, or, have designated the telephone number of a wireless or landline telephone. One problem associated with designating a pager as the device to be called by the outbound calling is that it requires a subscriber to carry both a pager to receive a general notification and a cellular phone to receive the detailed information. One problem associated with directing calls from the outbound calling feature to a wireless phone or a landline phone is that the subscriber may not wish to access or to be bothered by all detailed message notifications.

In addition to receiving real-time information related to messages received and stored in a voice mail system, A subscriber may also desire to know about all incoming communications to a communications device, such as a residential telephone. For example, a subscriber may desire to know if an incoming communication is being answered, if it receives a busy signal, if it is terminated, if it is forwarded to a different communications device (i.e., there currently isn't any way for a subscriber to know about all incoming communications when a line is ringing, answered, busy, etc., with detailed call information).

Subscribers away from their homes would like a way to know who has called them and whether or not that caller left a message. A subscriber can obtain this information in a proactive way by calling their voice mail systems/answering machines at will and determining whether there are any messages. However, this does not provide a complete list of who has called them, just who left a message. Some Customer Premises Equipment (CPE) is capable of paging a subscriber when an incoming call arrives, but this is limited to a pre-programmed set of callers they wish to be notified about. CPE is used to refer to equipment that a customer connects to the telephone system. Moreover, CPE does not announce the Calling Name delivery (CNAM) and Caller Identification (ID) because of the expense involved in doing so. Also, the duration of a call that does not terminate at the customer's premises is unknown by the CPE (for example, the call went to voice mail).

Thus, there is a current need for systems and methods for selecting, retrieving, storing, and managing detailed information related to all incoming communications to and all outgoing communications from a landline communications device. There is a further need to efficiently deliver this information to a remote communications device in order to provide real time and quasi-real time detailed message notification and similar information. There is still a further need to forward the communication or its equivalent to the remote communications device. Finally, there is a need to harmonize such information associated with multiple landline communications devices using different messaging systems.

BRIEF SUMMARY OF THE INVENTION

To overcome these problems, the present invention provides easy, reliable, and efficient methods and systems for detailed information related to all incoming communications to, and all outgoing communications from, a landline communications device, such as a residential phone connected to the Public Switch Telephone Network (PSTN), and delivers this information to a wireless communications device, such as an alphanumeric or interactive pager. Further, this invention includes a system that manages all detailed call information related to all incoming communications to a landline communications device and manages how this information is delivered and presented to the remote communications device. In an embodiment, the remote call notification is delivered in real-time or in quasi real-time, as delivery speed to the remote communications device varies depending upon the delivery medium. The remote call notification may be automatically forwarded to the remote communications device upon the arrival or termination of a new incoming communication. Alternatively, the remote call notification may be forwarded to the remote communications device using rules established by a subscriber, a calling party, a forwarding party, an administrator, and by other constraints (e.g., availability and load of the communications link to the remote communications device).

In one embodiment, the present invention provides a new telecommunications service referred to as Caller ID Anywhere (CIDA) (also referred to as Calling Name Anywhere or Remote Caller ID). In brief, this service allows a customer to obtain calling number and name, date & time of call, and call outcome information away from the telephone to be monitored. The service actually consists of two main components: Remote Call Notification (RCN), and Remote Call Log (RCL).

In one embodiment, the RCN service delivers information of an incoming call in quasi real time (delivery speed depending on the delivery medium). The information is sent automatically upon the arrival and/or termination of a new call. The information about the incoming call can be delivered as a web page, as an e-mail, as a Short Messaging Service (SMS) message, etc. If the information is delivered via an e-mail, the notification can be sent to an e-mail account, alphanumeric pager, interactive pager, Personal Digital Assistant (PDA), and given proper processing to an SMS-capable phone. If the information is delivered via a web page, more than one call state can be reported, e.g., ringing, answered, busy, hang up. The call information consists of the name and number of the caller (if available), date and time of the call, as well as additional information if available.

In one embodiment, the RCL service consists of a log of recent (completed) calls. The information in the call log can be sent to the subscriber automatically (periodically), but in most cases, the subscriber retrieves the information as desired. As with the RCN service, the call log includes essential call information such as the name and number of the caller, as well as the date and time of the call. Additional information, such as the length of each call, can also be included if available. The delivery methods for the call log information are the same as with the RCN service. In addition, the RCL service includes a voice interface so that subscribers can retrieve call log information by dialing a telephone number. Call log information can be retrieved for the current day, previous day, etc.

In one embodiment, the services emphasize delivery of quasi-real time calling party information to an interactive pager (in the form of an e-mail), or to a PC client, which in turn provides an Internet call waiting like pop-up web page. In addition, the service allows subscribers to request and receive call log data through interactive pagers, web pages, e-mail, and through their telephone (using a network-based Interactive Voice Response (IVR/XML) interface or Voice Extensible Markup Language (VXML interface). The subscriber is able to configure interactively his/her Caller ID Anywhere service through a PC. In addition, the subscriber is able to set or to request configuration changes through a service representative.

In a preferred embodiment, this invention detects an incoming communication, such as a phone call, on a communications link to a subscriber's communications device, such as a residential phone. Once an incoming message is detected, this invention creates a remote call notification that includes detailed information about the incoming communication. For example, the detailed information may include: (a) a calling number; (b) a name of a calling party associated with the calling number; (c) time identifiers that provide the times when the incoming communication is first detected and is terminated; (d) a length identifier that provides the length of the incoming communication; (e) a date identifier that provides the date that the incoming communication is received; (f) a status identifier that provides a real-time status of the incoming communication; (g) a disposition identifier; and (e) a priority identifier that indicates the importance of the incoming communication.

The status identifier indicates a real-time or quasi real-time status of the incoming communication into the network of the subscriber's communications device. For example, if the subscriber's communications device is a residential phone connected to the PSTN, then the terminating switch in conjunction with the service control point (SCP) can report the following status identifier's: (a) ringing, (b) answered, (c) busy, and (d) disconnected.

The disposition identifier provides information about the remote notification itself. For example, the disposition identifier can indicate that a remote call notification is "new" and that a subscriber has not reviewed the details of the incoming communication. Other examples of the disposition identifier include: (a) stored, (b) deleted, (c) restored, (d) forwarded, and (e) system administration. To save network storage, the deleted disposition identifier may optionally only be available for a set amount of time after a remote call notification is deleted (e.g., after 10 days) or for a certain number of remote call notifications that are deleted (after 10 remote call notifications are deleted).

This invention stores access addresses for one or more remote communications devices to receive the remote call notification. The remote communications device is any communications device capable of delivering remote call notification to a subscriber, such as, for example, a landline phone, mobile phone, a cellular phone, a satellite phone, a computer, a modem, a pager, an interactive pager, a personal digital assistant (PDA), and an interactive television. An exemplary embodiment of an access address for a computer may be a TCP/IP address, an instant messaging screen name, or an e-mail address.

The access address to be used may be determined using a number of different methods. For example, the access address used for a particular call may be selected by a subscriber's preferences, by a calling party's preferences, by a forwarding party's preferences, by an administrator of the communications network storing the remote call notification, or by the communication capabilities of the remote communications device (e.g., a calling party leave a video clip message and the network forwards it to a remote communication device capable of displaying the video clip, such as, for example, a PDA with appropriate display).

After a call is received and an access address is assigned, the remote call notification is forwarded through a communications network, such as the Public Switch Telephone Network or wireless data network, to the remote communications device. The remote call notification is presented to the remote communications device in a subscriber-friendly format, such as, for example, an audio format, a text format, a short message service (SMS) format, a video format, or a markup language document format. Alternatively, a voice interface may be created so that a subscriber of a remote communication device receives a remote call notification and can retrieve more information about the remote call notification by dialing a phone number.

This invention also allows a subscriber of the remote communications device to scroll through a plurality of remote call notifications (i.e., a log of remote call notifications), to select a particular remote call notification to retrieve an associated communications message (e.g., a voice mail associated with the remote call notification), and to present the communications message on the remote communications device (e.g., play the sound annotation of the voice mail). The communications message is presented in a subscriber-friendly format, such as, for example, an audio format, a text format, a Short Message Service (SMS) format, a video format, or a markup language document format.

Thus, this invention allows real-time remote call notification that is flexible to telecommunications subscribers having multiple communications devices, including multiple wireless communications device. This invention notifies a subscriber of all incoming communications, provides detailed information about each incoming communication, allows a subscriber to manage each incoming communication, and provides an option to retrieve and play each incoming communication to a remote communications device.

This invention allows a subscriber to always know about incoming communications even if the line was busy, multiple calls were received at the same time, and if the caller hung up before the call was answered. This invention allows small business subscribers to always know who called and when. Further, this service is useful for subscribers that do not like to check their voicemail often unless it is an important message, especially when calling long distance to check their voicemail.

To summarize the primary benefits, this invention: (1) allows subscribers to know who calls them virtually anywhere; (2) allows a subscriber to obtain information from incoming calls in real-time; (3) allows a subscriber to access a call log of recent calls; (4) indicates who called (name & number) and when (date & time), as well as certain call dispositions (answered, length of call, busy, call abandoned, voicemail left); (5) allows a subscriber to receive information about incoming calls using different devices (e.g., pagers, mobile phones, web browsers, personal computers, PDAs, etc.); and (6) allows a subscriber to customize useful configuration options (e.g., priority and filter-out numbers, caller information delivery based on call outcome, etc.).

BRIEF DESCRIPTION OF THE DRAWINGS

These and other features, aspects, and advantages of the methods and systems for using an AIN to deliver caller ID to wireless devices, for calls delivered to landline networks, are better understood when the following Detailed Description of the Invention is read with reference to the accompanying drawings, wherein.

DETAILED DESCRIPTION OF THE INVENTION

Figure 1:
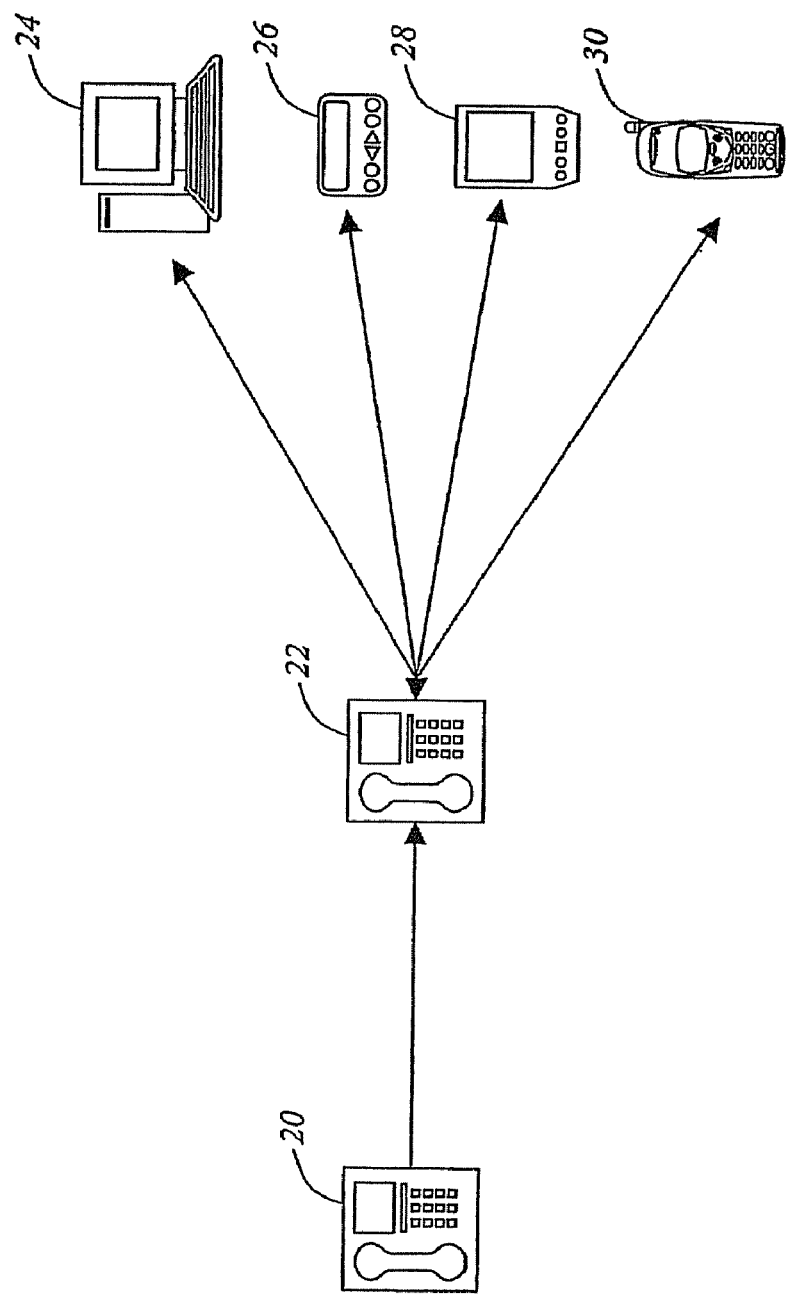
FIG. 1 is a diagram illustrating call flow through communication devices in accordance with an exemplary embodiment of the present invention.

As required, detailed embodiments of the present invention are disclosed herein, however, it is to be understood that the disclosed embodiments are merely exemplary of the invention that may be embodied in various and alternative forms. Specific structural and functional details disclosed herein are not to be interpreted as limiting, but merely as a basis for the claims as a representative basis for teaching one skilled in the art to variously employ the present invention. Conventional hardware and systems are shown in block diagram form and process steps are shown in flowcharts.

The term "calling party" is used herein generally to refer to the person or device that initiates a telecommunication. The calling party may also be referred to herein as "caller." In some examples, the calling party may not be a person, but may be a device such as a facsimile machine, an answering machine, a modem, etc. The term "called party" is used herein generally to refer to the person or device that answers or responds to the call or communication. The term "communication" is used herein to include all messages or calls that may be exchanged between a calling party and a called party, including, voice, video, and data messages. The term "communication" is used synonymously herein with the term "call" unless a distinction is noted. The term "subscriber" is used herein to generally refer to a subscriber of the described telecommunications service. The term "Internet" refers to both the Internet and an intranet, unless a distinction is noted. Similarly, the term "Internet-accessible device" refers to a data communications device that has the capability to access the Internet or an intranet.

In one embodiment, the present invention provides a new telecommunications service referred to as Caller ID Anywhere (CIDA) (also referred to as Calling Name Anywhere or Remote Caller ID). In brief, this service allows a customer to obtain calling number and name, date & time of call, and call outcome information away from the telephone to be monitored. The service actually consists of two main components: Remote Call Notification (RCN), and Remote Call Log (RCL).

In one embodiment, the RCN service delivers information of an incoming call in quasi real time (delivery speed depending on the delivery medium). The information is sent automatically upon the arrival and/or termination of a new call. The information about the incoming call can be delivered as a web page, as an e-mail, as a Short Messaging Service (SMS) message, etc. If the information is delivered via an e-mail, the notification can be sent to an e-mail account, alphanumeric pager, interactive pager, Personal Digital Assistant (PDA), and given proper processing to an SMS-capable phone. If the information is delivered via a web page, more than one call state can be reported, e.g., ringing, answered, busy, hang up. The call information consists of the name and number of the caller (if available), date and time of the call, as well as additional information if available.

In one embodiment, the RCL service consists of a log of recent calls. The information in the call log can be sent to the subscriber automatically (periodically), but in most cases, the subscriber retrieves the information as desired. As with the RCN service, the call log includes essential call information such as the name and number of the caller, as well as the date and time of the call. Additional information, such as the length of each call, can also be included if available. The delivery methods for the call log information are the same as with the RCN service. In addition, the RCL service includes a voice interface so that subscribers can retrieve call log information by dialing a telephone number. Call log information can be retrieved for the current day, previous day, etc.

Briefly, the Caller ID Anywhere service of the present invention works in the following way. For call notification, a subscriber receives a call to his/her phone. The service checks to determine how the customer desires to be notified about the call, namely, via interactive pager, e-mail, and/or via a web page that pops-up in the subscriber's computer screen. If notification is to occur via interactive pager (e-mail), the service waits until the call ends and then sends a page (a specially-formatted e-mail) to the interactive pager. If notification is to occur via PC, the service opens a window on the designated PC, which the subscriber has designated beforehand. Up to several PC updates may be sent per call event: one as soon as a new call is received; another when the phone is answered or it is determined that the line is busy; and one when the call ends, indicating the final outcome of the call (e.g., voice-mail left or call length). The PC window may be activated using special CIDA client software, or using java-based browser interface.

For call log requests, a subscriber can request call log information at any time. To retrieve call logs using an interactive pager, a subscriber sends an e-mail to a predefined address. The e-mail contains a command to specify the record(s) to be retrieved. If a web browser is used, the subscriber logs into a web page for the service and requests the desired record(s). A subscriber also has the option of calling a number and then following instructions for the retrieval of the call record(s), either by listening to the record(s), or by requesting that the record(s) be sent to a fax number.

According to one embodiment, the systems of the present invention utilize the intelligent functionality of an Advanced Intelligent Network (AIN). An AIN is a network used in conjunction with a conventional telephone network, such as the Public Switched Telephone Network (PSTN), to provide enhanced voice, video, and data services and dynamic routing capabilities.

Referring to FIG. 1, looking at the CIDA service of the present invention briefly, the service allows subscribers to know who calls them no matter where the subscriber is located. The service allows a subscriber to obtain information regarding incoming calls from a caller device 20 in real-time, or quasi real-time, and have access to a call log of recent calls. The service indicates who called (name and number) a subscriber telephone 22 and when (date and time), as well as certain call dispositions (answered, length of call, busy, call abandoned, and voice-mail left). The caller information is accessed using a number of subscriber devices, such as an personal computer 24, an interactive pager 26, a personal digital assistant (PDA) 28, a mobile telephone 30, etc.

Figure 2:
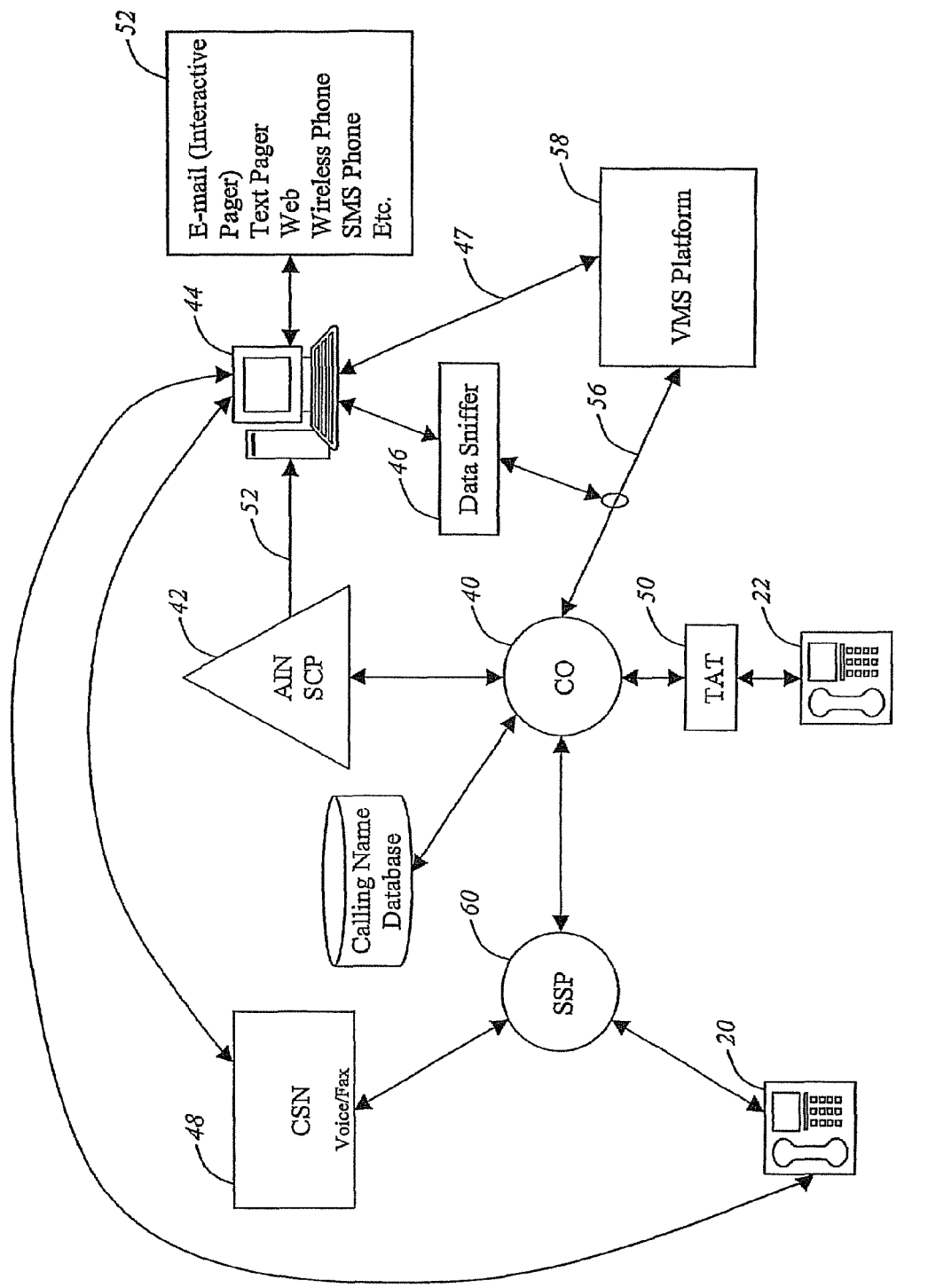
FIG. 2 is a block diagram illustrating the Caller ID Anywhere (CIDA) service system architecture for a wireline system in accordance with an exemplary embodiment of the present invention.

Referring to FIG. 2, in one embodiment, call-processing architecture in which the CIDA service of the present invention is provided to wireline subscribers is shown. The main hardware/software components of the CIDA service include a home Central Office (CO) 40, Service Control Point (SCP) 42, CIDA server 44, Data Sniffer 46, VMS interface 47, Service Switching Point (SSP) 60, and an Intelligent Peripheral, such as a Compact Service Node (CSN) 48.

The home CO 40 of the subscriber's line is equipped with a Termination Attempt Trigger (TAT) 50, or any other suitable terminating trigger, such as a Public Office Dialing Plan (PODP) for a trunk. A TAT 50 (or potentially, a PODP trigger) is provisioned on the subscriber's line. Upon receiving a call, the TAT 50 fires and the switch requests instructions from the SCP 42 as to how to proceed with the call. The SCP 42 responds with an authorize termination. The SCP 42 requests from the switch that it is notified about subsequent changes in the call state (i.e., busy, answer, disconnect) as soon as these happen. When a change in the call state occurs, the home switch notifies the SCP 42 immediately. The SCP 42 handles queries from the TAT 50. The SCP 42, by communicating with the subscriber's CO 40, keeps track of call events on the subscriber's line and notifies the CIDA server 44 appropriately. The SCP 42 responds to the TAT 50 query with an authorize termination and instructs the switch to be notified whenever there is a change in the status of the call (e.g. it requests termination notification). The SCP 42 is also aware of the different possible status of a call, namely, ringing, busy, answer, and disconnect. Whenever there is a change in the status of the call, the SCP 42 sends a message to the associated CIDA server 44 to notify this change. The SCP 42 is provisioned one-time with the CIDA server IP address, assuming TCP/IP connectivity 52 is used. For each new subscriber, the SCP 42 is provisioned with the new subscriber number and any pertinent additional information so that the SCP 42 can respond to the TAT 50 query. Also, the SCP 42 generates measurements which may need to be retrieved periodically.

The CIDA server 44 serves as web host for the CIDA service, keeping subscriber information as well as all call records. All call notifications originate from the CIDA server 44. The CIDA server 44 also handles and serves all requests for call log information from subscribers. The CIDA server 44 also communicates with the CSN 48, and receives data from the voice mail system, either directly over a custom interface 47, or indirectly using a Data Sniffer 46. The CIDA server 44 is the main component of the CIDA service. In brief, the CIDA server 44 is a data repository, web server, administration server, CSN server, and e-mail server. The CIDA server 44 receives and processes call state updates from the SCP 42, receives and processes voice-mail notifications from the Voice Mail interface 47 or Data Sniffer 46, updates the Data Sniffer 46 with information about phone numbers that need to be removed/added from its "to monitor" list, performs administrative functions for subscribers, returns queries for call log information back to the subscriber with the appropriate data (queries in the form of emails or queries through a web page), and notifies subscribers of pertinent call events according to the device(s) that are specified by the subscriber. At a minimum, the CIDA server 44 is provisioned with the telephone numbers for the CIDA subscriptions. Also, depending upon the subscribers' preferences, parameters may be provisioned as well when entering a new subscriber, such as devices 54 and their electronic addresses that are supported for call notification and call log(e.g., interactive pagers, e-mail accounts) in addition to a web browser, and maximum call log capacity if an active subscriber has requested an expanded call log.

The CSN 48 is used to provide an Interactive Voice Response (IVR) or Voice Extensible Markup Language (VXML) interface for retrieving call log information. The CSN 48 allows subscribers of the CIDA service to obtain call log information over the phone. For each session (i.e., for each call to the CSN 48), the CSN 48 is in constant communication and requests subscriber data from the CIDA server 44. The CSN 48 verifies that the calling party is calling from the subscribed phone and has the proper Personal Identification Number (PIN). The CSN 48 also allows a subscriber to check the call log or to request that a call log be sent to a fax number. The CSN 48 asks the subscriber which log is to be played/sent (e.g., today's, yesterday's, or for a specific day). A subscriber is able to fast forward, skip back or forward, or even erase call log entries. Call log entries may be erased for the IVR/VXML interface. Erased call log entries may be erased for convenience for the IVR/VXML interface, but may still be available over the Internet. Up to about 100 caller records may be retrieved over the IVR/VXML interface. The IVR/VXML interface also has an option that allows a subscriber to provide a fax number where call log information can be sent. Aside from initial service provider access and load and communication with the CIDA server 44, no additional provisioning is required.

The Data Sniffer 46 is attached to Inter-switch Simplified Message Desk Interface (ISMDI) links 56 of the Voice-Mail Service (VMS) platforms 58 that serve an appropriate region. The Data Sniffer 46 monitors, at all times, the ISMDI links 56 from the voice-mail platforms 58. The Data Sniffer 46 notifies the CIDA server 44 when it "sees" that a voice-mail platform 58 is notifying a home switch to turn on voice-mail waiting notification for a specific subscriber. With this information, the CIDA server 44 is able to deduce when a recently terminated call resulted in a voice-mail. The Data Sniffer 46 is a computer that is installed to monitor the traffic in the ISMDI links 56 of voice-mail platforms 58 that serve the CIDA service area. The ISMDI links 56 carry the message from voice-mail platforms 58 to voice-mail subscriber home switches to indicate that a new voice-mail message has arrived. The Data Sniffer 46 receives periodic updates from the CIDA server 44 on what phone numbers to monitor, and what phone numbers no longer need to be monitored. The Data Sniffer 46 also constantly analyzes the traffic on the ISMDI link 56. Upon finding a number that matches its "to monitor" list, it then sends a message to the CIDA server 44. The Data Sniffer 46 sends one message to the CIDA server 44 every time it finds a matching phone number. The SCP 42 supplies the Data Sniffer 46 with a list of numbers to be monitored. When a Data Sniffer 46 detects that a phone number that matches any entry in its "to watch list" is being sent through the link, the Data Sniffer 46 notifies the SCP 42 immediately about this event. Aside from initial service provider access and load and communication with the CIDA server 44, no additional provisioning is required.

In an alternative embodiment, the functions of the Data Sniffer 46 may be implemented more effectively in the voice mail platform. In this configuration, the voice mail platform communicates new voice mail information (calling number, message indicator, length of massage, etc.) directly to the CIDA server 44. In this configuration, the Data Sniffer 46 is not needed.

Once the CIDA service of the present invention is provisioned on a subscriber's line, the CIDA server 44 automatically begins logging calls to the subscriber's line. CIDA functions and options may be initially set to an initial default level of monitoring. Multiple methods are provided to administer the whole or parts of the service. Using the service for the first time, a subscriber can access a CIDA web administration page, or can call a service representative to set up and start the service.

The different interfaces needed for the CIDA service include RCN and RCL. The RCN interface includes: (1) a web or PC client page that notifies a subscriber of a new call, the interface presents data and may offer a number of action buttons; (2) an interactive pager notification for the presentation of data in e-mail; and (3) web page-based administration of the service, which is accomplished using a comprehensive interface that allows the subscriber to control and customize the RCN service. The RCL interface includes: (1) a web page that provides several options (e.g., numbers to filter, time window, etc.) for the display of call log data; and (2) a touch-tone-based interface for playing call log data using an IVR/VXML. The interface also provides an option to request that call records be sent to a fax machine.

Figure 3:
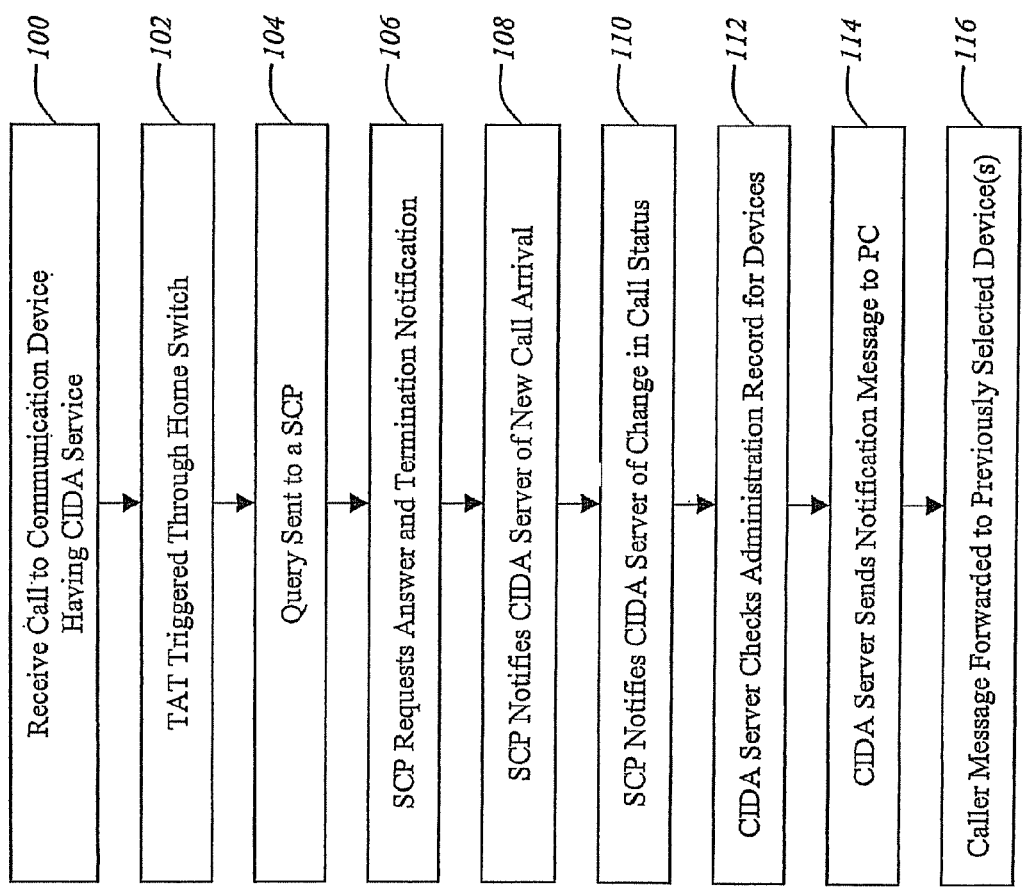
FIG. 3 is a flow diagram illustrating call flow for call notification in accordance with an exemplary embodiment of the present invention.

Referring to FIG. 3, call flows for call notification, a calling party first calls a number that subscribes to the CIDA Service in Step 100. When call setup reaches the final CO 40 (the home switch for that subscriber), a TAT 50 for that number is triggered in Step 102. A query is then sent to the SCP 42 in Step 104. In Step 106, the SCP 42 responds to the switch authorizing termination, and in addition, requests an answer and termination notification. In Step 108, the SCP 42 then sends a message to the CIDA server 44 immediately notifying the server 44 of a new call arrival. In Step 110, as soon as the SCP 42 hears from the switch about a change in the status of the call (answered, call dropped, disconnect, busy), the SCP 42 notifies the CIDA server 44 of a change in status. In Step 112, when the CIDA server 44 is notified of a new call, the CIDA server 44 checks the administration records of the subscriber to determine if the server 44 is required to notify a device 54 (quasi real-time) of the new call arrival. If so, in Step 114, the CIDA server 44 sends a message to the subscriber's pre-determined personal computer 24 so that the computer 24 can open a window describing the new call. The changes in status of a call may result in additional messages being sent by the CIDA server 44. In Step 116, the end of a call can result in a message being sent to the subscriber's previously selected device 54 (e.g., interactive pager, e-mail, SMS phone, etc.). The CIDA server 44 can also receive messages from the Data Sniffer 46 or VMS interface 47 in order to determine if a recently ended call resulted in a voice-mail left for the subscriber.

A subscriber can retrieve call log information by either accessing an Internet-connected device (e.g., computer with web browser, interactive page, SMS phone, etc.), or, by calling a phone number that provides an IVR/XML interface for the retrieval of the call log information. The retrieval of call log information data through an Internet-connected device generally does not require making a phone call specifically for this purpose. Rather, the subscriber is able to request data by accessing a web site and "clicking" for the desired information, or by sending a request by other means, e.g., by sending an e-mail with a command to request this data.

If a subscriber desires to retrieve call log information via phone, he/she can call a phone number that terminates on a CSN 48. The CSN 48 includes an IVR/VXML interface that is operable for aiding a caller in navigating different options when retrieving call log information. Also, the IVR/XML main menu may provide a "fax option". For this option, the subscriber may enter a phone number, and call log information is automatically faxed to this number.

Administrative functions for the CIDA service can be performed from a web browser by accessing a CIDA administration page, the IVR/VXML interface (only pertinent to call log retrieval through the IVR/VXML interface, including FAX requests), and an interactive pager in the form of specially formatted e-mails (e-mail-based administration will only affect call notification and call log retrieval through the interactive pager).

In order to access the web-based administration page, a subscriber needs to enter the subscribed phone number as well as a PIN. At a minimum, a subscriber will find the following functions and options available: (1) the ability to turn the whole CIDA service "ON" or "OFF". Default is "OFF"; (2) the ability to change a PIN; (3) there will be columns for each supported device (interactive pager, PC, e-mail); (4) pull-down menus that list when the service should be "ON": e.g., standard (all times), weekdays only (Mo-Fr), weekends only (Sa, Su), notification for particular device "OFF" (default); (5) a field that allows a subscriber to change his/her e-mail address; (6) for the interactive pager and e-mail columns, the subscriber can set a checkmark so that call notification will occur depending upon the call event detected (e.g. answered calls, unanswered calls, busy calls, and calls that resulted in voice-mail). The default setting is that all of these boxes will be checked; (7) for the PC column, the subscriber can set a checkmark so that notifications(s) can occur as soon as the following call events are detected: 1) Ringing, 2) Call Answered, 3) Busy detected, 4) Hang up, 5) Voice-mail detected. The default setting is that all of these boxes will be checked; (8) the ability to set "priority numbers" for each device. When a call is received from a priority number, it overrides the settings in 6 & 7, and the notification is allowed. Also, for numbers entered that have less than 10 digits, a wildcard character, such as "*", can be assumed at the end of the last digit; and (9) the ability to set "filter-out numbers" for each device. When a call is received from a filter-out number, no notification is sent to the device. The wildcard characters mentioned above can also be applicable for filter-out numbers.

The call log administration page can be accessed through the call notification administration page. This paragraph presents examples of the controls that are available for subscribers that want the log to be sent to their interactive pager or to a specific e-mail address. At a minimum, the following functions and options are available to the subscriber for both the interactive pager and the specific e-mail address: (1) the ability to change the e-mail address (not available for interactive pagers); (2) the ability to set a "filter-out number" for each device. These are numbers that are used to filter-out the call log records before they are sent. Wildcard characters "*" and "?" can also be used; (3) the ability to set the maximum number of records that can be sent; (4) the ability to set "show-only number". When this option is chosen, only records that contain the "show-only number" are sent. Wildcard characters "*" and "?" can also be used; and (5) the ability to set the following delivery options: 1) Now, 2) Daily (and time), Weekly (what day Mo-Su and time), and Monthly (what day and time).

A small number of administration functions are provided for subscribers that use an IVR/VXML interface, such as password change and fax number change (where the call log can be sent). Administration functions are also provided to subscribers that receive call notification and/or call logs through their pager. The administration functions execute by sending an e-mail from the registered pager or e-mail address to the e-mail addresses that delivers the call notifications and the call logs, which includes a simple command in the subject line. For multiple commands, the body of the e-mail may be used. All commands sent, if properly executed, receive a confirmation. A sample of commands that can be sent are as follows:

For Call Notification:
NOTIFICATION [ON, OFF, WEEKDAY, WEEKEND] (blank returns current ON/OFF state of notification service)
FILTEROUT [numbers(s)]
CANCEL FILTEROUT [number(s)] (blank will delete all current filter-out numbers)
PRIORITY [numbers(s)]
CANCEL PRIORITY [NUMBERS(S)] (blank will delete all current priority numbers)
For Call Log:
LOG LIMIT [number]
SEND LOG [TODAY, YESTERDAY, MM/DD/YY] (blank sends current call log up to maximum number of records specified in LOG LIMIT]
FILTEROUT [number(s)]
CANCEL FILTEROUT [number(s)] (blank will delete all current filter-out numbers)
SHOW ONLY [number(s)]
CANCEL SHOW ONLY [numbers(s)] (blank will delete all current priority numbers)

When PC-based call notification has been set, a pop-up window may appear on the screen according to the settings described above. For a given call, there may be several windows displayed on the screen, corresponding to: call ringing, call busy, call answered, call disconnect, voice-mail left. Each new screen may replace the previous screen. The notifications are sent as soon as the call event is detected, so that if possible, notifications will appear in real-time. Depending upon the call state, the name and number of the caller ("Private" or "Unknown" may appear instead when the calling number is blocked or unknown), the date and time of event, and the call state (if the call state is "disconnect", the total call time will be displayed as well) may be displayed on the screen.

General controls may also appear under the screen, such as "Close" which closes the window, "View Log" which opens web page, "Suspend" which suspends the delivery of call notification information; this button after pressed may be replaced with "Resume", and "Edit" which brings up the call notification administration page.

For interactive pager or e-mail notification, only the "last state" of the call (i.e. busy, disconnect, or voice-mail left) may be reported. In addition to the "last state", and as described above, the name and number of the caller as well as the date and time of the event is recorded. If the calling number is blocked or unknown, then "Private" or "Unknown" may appear instead of the calling name and number. For example, for calls which last more than 6 minutes, a notification may be sent indicating that the length of the call is over 6 minutes. This description may be used instead of a description of the last state of the call.

In one embodiment, for each subscriber, an internal database keeps call records. For example, for high call volume subscribers, the last one thousand or so calls may be recorded to the subscriber number. For low call volume subscribers, for example, only about one hundred records may be recorded to the subscriber number. Old call records may be deleted according to a first-in first-out (FIFO) discipline. Call log retrieval functions (through either the web, IVR/VXML interface, pager, or e-mail) are not affected by the number of records stored in the database. The call log displays the final state of the call. The information for each record consists of the name and number of the caller, ("Private" or "Unknown" may appear instead when the calling number is blocked or unknown), the date and time when the call was received, the date and time when the call ended, and the final outcome of call: abandoned, answered, busy, voicemail, etc. For answered and voice-mail calls, the total time of the call may be appended.

Calls may be ordered according to the date and time when the call was received. For calls that are longer than 6 minutes, for example, a provisional record is created when the call reaches the 6 minute mark. This record is updated later when the call ends. For call log retrieval through the web, a scrollable window with all of the available call records is provided. The following filter controls are available so that the subscriber can narrow the number of records that are displayed (these filters are set to OFF by default): (1) call record extraction by date: From mm/dd/yy at hh to mm/dd/yy at hh; (2) show only numbers (wildcard characters "*" and "?" are allowed); (3) filter-out numbers (wildcard characters "*" and "?" are allowed); and (4) show calls with the following outcome: abandoned, answered, busy, voice-mail, etc.

Subscribers can retrieve call log information by calling a designated number. The subscriber is able to retrieve the call log for "Today", "Yesterday", or for a specific date. The call log information includes the name and number of the caller and the date and time of the call. If there is more than one call from a given number, there is an indication about the number of calls that have been received by this number, and only the date and the time of the last call is reported. In other words the behavior is similar to that of a conventional caller ID box. If the calling number is blocked or unknown, then "Private" or "Unknown" is reported to the caller. To save time during future calls, the subscriber, while listening to the call record, is able to "delete" call records. The deletion of these records only affects the IVR/VXML interface, since the records that reside in the CIDA server 44 are not affected.

In one embodiment, call log information received through an interactive pager or e-mail includes the same information as the call records that are viewed using a web browser, such as the name and number of the caller, the date and time when the call was received, the date and time when the call ended, and the final outcome of call. Records for busy calls only include the date and time when the call was received. Call logs to a pager or e-mail address can be received automatically or can be requested, also, certain filters can be used to narrow the amount of call records that are requested.

While preferred embodiments of the invention have been described in detail, it will be apparent to those skilled in the art that the disclosed embodiments may be modified. Therefore, the foregoing description is to be considered exemplary rather than limiting, and the true scope of the invention is that defined in the following claims.

What is claimed is:

1. A remote call notification system, comprising:
a switch operable for detecting an incoming communication on a communications link to a subscriber's wireline communication device, wherein the switch is in communication with the wireline communication device by the communications link;
a network element in communication with the switch operable for monitoring the status of the incoming communication;
an intelligent server in communication with the network element operable for originating a remote call notification, the remote call notification sent to a remote communications device upon detection of the incoming communication, wherein the remote call notification comprises:
a first time identifier that provides the time that the incoming communication is first detected, and
a priority identifier that indicates the importance of the incoming communication; and
a monitoring module in communication with the intelligent server operable for monitoring traffic in a communications network of voice-mail platforms that serve the intelligent server service area;
wherein the intelligent server provides administrative functions for the subscriber, the administrative functions including disabling types of remote call notifications to be sent to the remote communications device, the disabling of types of remote call notifications being overridden in the event that a call is from a priority number.

2. The system of claim 1, wherein functions of the intelligent server further comprise one of the following: serving subscriber requests for call log information, updating the module, performing administrative functions for the subscriber, returning queries for the call log information with appropriate data, and notifying the subscriber of pertinent call events according to the remote communications device specified by the subscriber.

3. The system of claim 1, further comprising:
means for presenting the remote call notification to the remote communications device in a format, wherein the format comprises one of the following: an audio format, a text format, a short message format, a video format, and a markup language format.

4. The system of claim 1, wherein the remote communications device comprises one of the following: a mobile telephone, a landline telephone, a computer, a pager, and a personal digital assistant.

5. The system of claim 1, wherein the remote call notification is transceived through the communications network to an access address associated with the remote communications device using wireless communication signals.

6. The system of claim 1, wherein the communications network comprises one of the following: a celestial communications network and a terrestrial communications network.

7. A remote call notification method, comprising:
detecting an incoming communication on a communications link to a subscriber's communication device;
creating a remote call notification, wherein said remote call notification comprises:
a first time identifier that provides the time that the incoming communication is first detected, and
a priority identifier that indicates the importance of the incoming communication;
assigning an access address associated with a remote communication device;
forwarding the remote call notification through a communications network to the access address associated with the remote communication device, the remote call notification forwarded upon detection of the incoming communication;

creating a call log associated with the remote call notification; and providing administrative functions for the subscriber, the administrative functions including disabling types of remote call notifications to be sent to the remote communications device, the disabling of types of remote call notifications being overridden in the event that a call is from a priority number.

8. The method of claim 7, further comprising:

presenting the remote call notification to the remote communication device in a format, wherein the format comprises one of the following: an audio format, a text format, a short message format, a video format, and a markup language format.

9. The method of claim 7, wherein the remote communication device comprises one of the following: a wireline phone, a wireless phone, a computer, a pager, and a personal digital assistant.

10. The method of claim 9, wherein the pager comprises an interactive pager capable of transceiving the remote call notification.

11. The method of claim 7, wherein the remote call notification is transceived through the communications network to the access address associated with the remote communication device using wireless communication signals.

12. The method of claim 7, wherein the communications network comprises one of the following: a celestial communications network and a terrestrial communications network.

13. The method of claim 7, further comprising:

associating the access address with a plurality of communications devices.

14. A remote call notification system, comprising:

a server detecting an incoming communication to a communications device;

the server originating a remote communication notification and sending the remote communication notification to a remote communications device upon detection of the incoming communication, wherein the remote communication notification comprises:

a time identifier that provides the time that the incoming communication is first detected, and a priority identifier that indicates the importance of the incoming communication; and a monitoring module in communication with the server operable for monitoring traffic in a communications network of a mail platform;

wherein the server provides administrative functions for the subscriber, the administrative functions including disabling types of remote call notifications to be sent to the remote communications device, the disabling of types of remote call notifications being overridden in the event that a call is from a priority number.

15. The system of claim 14, wherein the communication is a call, and the mail platform is a voice-mail platform.

16. The system of claim 14, wherein the server detects the incoming communication to a wireline communications device and sends the remote communication notification to the remote communications device including at least one of a mobile telephone, a landline telephone, a computer, a pager, and a personal assistant.

17. The system of claim 14, wherein functions of the server further comprise at least one of the following: serving requests for communication log information, updating the monitoring module, performing administrative functions for a subscriber to the remote notification system, returning queries for the communication log information with appropriate data, and notifying the subscriber of pertinent communication events according to the remote communications device specified by the subscriber.

* * * * *